(12) United States Patent
Hildenbrand, Jr. et al.

(10) Patent No.: US 7,093,284 B2
(45) Date of Patent: Aug. 15, 2006

(54) METHOD, SYSTEM, AND STORAGE MEDIUM FOR PREVENTING RECURRENCE OF A SYSTEM OUTAGE IN A COMPUTER NETWORK

(75) Inventors: Francis J. Hildenbrand, Jr., Wappingers Falls, NY (US); Julia S. Purdy, Hopewell Junction, NY (US); Larry T. Severo, Newburgh, NY (US)

(73) Assignee: International Business Machines Corporation, Armonk, NY (US)

( * ) Notice: Subject to any disclaimer, the term of this patent is extended or adjusted under 35 U.S.C. 154(b) by 1031 days.

(21) Appl. No.: 10/074,139

(22) Filed: Feb. 12, 2002

(65) Prior Publication Data

US 2003/0163721 A1    Aug. 28, 2003

(51) Int. Cl.
*H04L 9/32* (2006.01)

(52) U.S. Cl. .................. 726/7; 726/4; 726/21

(58) Field of Classification Search ............ None
See application file for complete search history.

(56) References Cited

U.S. PATENT DOCUMENTS

| | | | | |
|---|---|---|---|---|
| 4,922,491 A | 5/1990 | Coale | ............ | 371/16.1 |
| 5,253,184 A | 10/1993 | Kleinschnitz | ............ | 364/550 |
| 5,421,006 A | 5/1995 | Jablon et al. | ............ | 395/575 |
| 5,475,813 A * | 12/1995 | Cieslak et al. | ............ | 714/4 |
| 5,483,637 A | 1/1996 | Winokur et al. | ....... | 395/183.02 |
| 5,774,650 A | 6/1998 | Chapman et al. | ............ | 395/186 |
| 5,806,077 A | 9/1998 | Wecker | ............ | 707/501 |
| 5,835,770 A | 11/1998 | Shum et al. | ............ | 395/704 |
| 5,864,653 A * | 1/1999 | Tavallaei et al. | ............ | 714/2 |
| 6,067,551 A | 5/2000 | Brown et al. | ............ | 707/203 |
| 6,105,146 A * | 8/2000 | Tavallaei et al. | ............ | 714/2 |
| 6,161,932 A | 12/2000 | Goto et al. | ............ | 351/208 |
| 6,253,236 B1 * | 6/2001 | Troxel et al. | ............ | 709/217 |

* cited by examiner

*Primary Examiner*—Gilberto Barrón
*Assistant Examiner*—Virgil Herring

(57) ABSTRACT

An exemplary embodiment of the invention relates to a method, system, and storage medium for preventing recurrence of a duplicate system outage in a computer network. The system comprises a server coupled to a network bus; an operating system executing on the server which includes an ABEND processing section; a logon authorization section; and a command processing section. A data storage device is operably connected to the server. The data storage device includes a persistent storage area that stores user ID files including user account records associated with network system users. The user account records store user IDs. The persistent storage area further includes an exemption list; an offending user ID field; and modifying modules associated with the operating system. The system also comprises at least one workstation operably coupled to the network bus. Upon an outage occurrence, the modifying modules cause the operating system to determine a user ID responsible for the outage occurrence, selectively lock out a workstation associated with the user ID, and upon system resolution, reinstate access to the user ID. Other embodiments include a method and storage medium for implementing the invention.

12 Claims, 3 Drawing Sheets

METHOD, SYSTEM, AND STORAGE MEDIUM FOR PREVENTING RECURRENCE OF A SYSTEM OUTAGE IN A COMPUTER NETWORK

BACKGROUND

The present invention relates generally to computer operating systems, and more particularly, the present invention relates to a method, system, and storage medium for preventing the recurrence of a system outage in a computer network.

Business enterprise networking systems and related system extensions and upgrades are growing in number and sophistication due, in part, to the increasing popularity of the Internet. Computer manufacturers and computer component manufacturers continuously strive to keep up with the challenges of ensuring consistent and reliable operation of these systems. To this end, error detection and recovery mechanisms have been devised in an effort to prevent malfunctions and system outages. Specific causes of computer system malfunctioning include corruption of memory data, corruption that is related to fixed disks or removable media, operating system errors, component errors, applications or operating systems performing illegal instructions with respect to the processor, and incompatibility between various hardware and software system components, to name a few. Existing solutions have been developed for detecting and reporting errors for subsequent analysis and repair by a system operator or by the system itself.

For example, memory data corruption can be handled by parity detection and/or error correcting code (ECC). Illegal instructions can be trapped by the processor and in some cases handled either within the processor or by the operating system. Other malfunctions may result in system "hangs." A system is "hanged" when it is no longer able to respond to user inputs and/or is not able to respond to system events including incoming network traffic, etc. Some malfunctions that can result in system hangs include operating systems or hardware components entering unknown or indeterminate states, causing the operating system or hardware component to cease normal operation. In these cases, the computer user must restart the computer. Restarting the computer after a system hang can cause problems such as data loss and corruption. Recent attempts to alleviate data corruption problems occurring under these circumstances include 'watchdog' timers that cause a processor to periodically reset a timer which, when the timer reaches a certain value, the computer system is reset. This solution does not cure the malfunction but only resets the computer system. Further, resetting the computer system may result in data loss and corruption as described above. Error checking processors have been developed for detecting and recovering from system hangs; however, they are costly to implement.

Particularly for mid-size and large computer network systems, one notable problem exists when an outage caused by a computer user recurs when the offending user logs back into the system and performs the same operation that caused the failure in the first place and before support personnel are able to perform debug analysis on the prior outage. Debug analysis of a system outage generally includes examination of a system storage dump at the time of the failure. This analysis and repair can take minutes, hours, or even days depending upon the complexity of the networking system and the severity of the error. In the meantime, the system remains exposed to the risks of a duplicate outage occurring as the offending user attempts to gain access to the system and perform the same operation that caused the original outage. What is needed, therefore, is a means to protect a system from multiple outages that result when a user repeats a series of events that had previously tripped an integrity exposure in the operating system resulting in a prior outage.

The above discussed and other drawbacks and deficiencies of the prior art are overcome or alleviated by the duplicate outage prevention tool of the invention.

SUMMARY

An exemplary embodiment of the invention relates to a method, system, and storage medium for preventing recurrence of a duplicate system outage in a computer network. The system comprises a server coupled to a network bus; an operating system "executing on the server which includes an ABEND (Abnormal End) processing section; a logon"authorization section; and a command processing section. A data storage device is operably connected to the server. The data storage device includes a persistent storage area that stores user ID files including user account records associated with network system users. The user account records store user IDs. The persistent storage area further includes an exemption list; an offending user ID field; and modifying modules associated with the operating system. The system also comprises at least one workstation operably coupled to the network bus. Upon an outage occurrence, the modifying modules cause the operating system to determine a user ID responsible for the outage occurrence, selectively lock out a workstation associated with the user ID, and upon system resolution, reinstate access to the user ID. Other embodiments include a method and storage medium for implementing the invention.

BRIEF DESCRIPTION OF THE DRAWINGS

Referring to the exemplary drawings wherein like elements are numbered alike in the several FIGURES.

DETAILED DESCRIPTION

Figure 1:
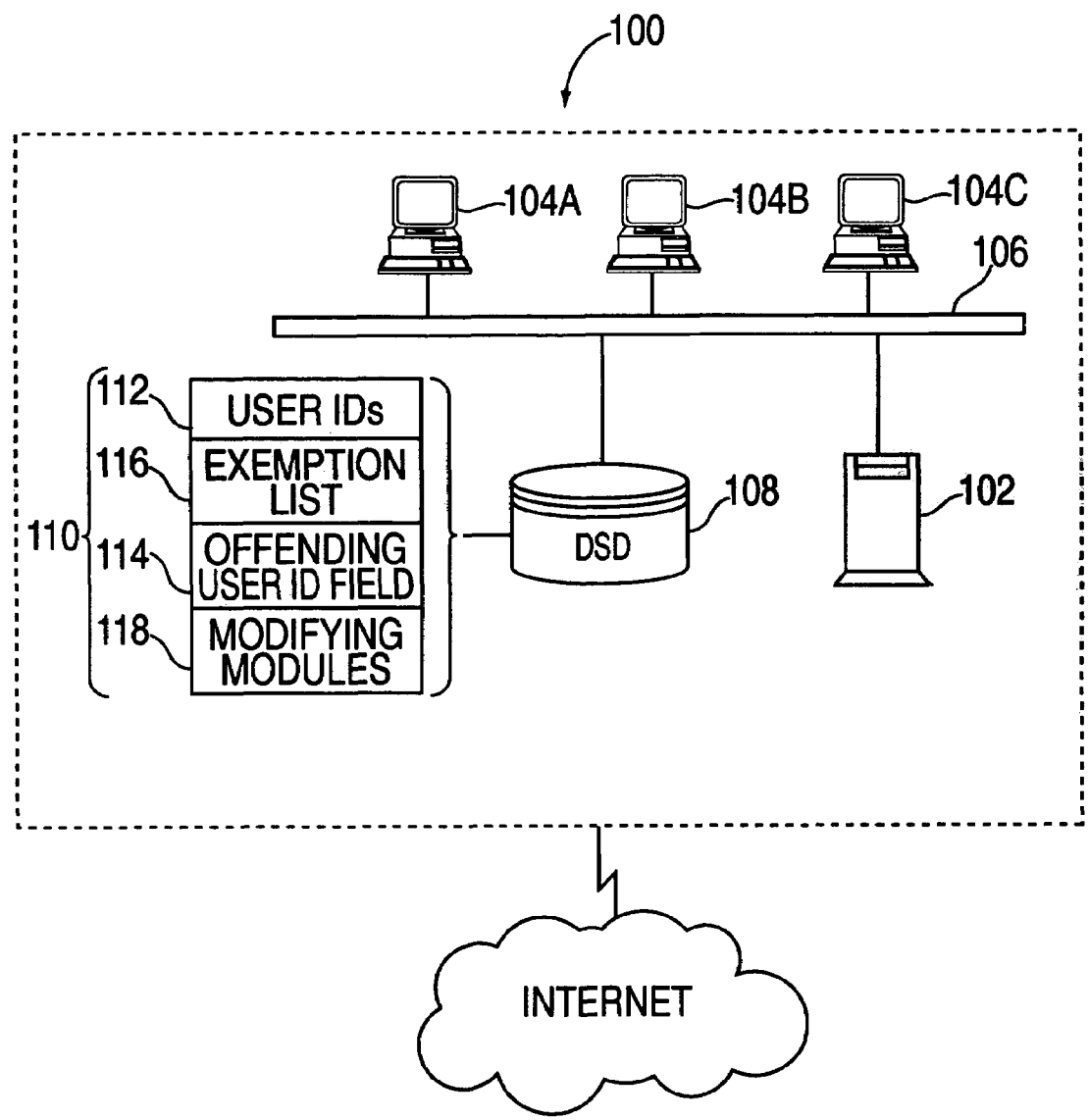
FIG. 1 is a block diagram of a network system upon which invention is implemented in an exemplary embodiment.

The duplicate outage prevention tool of the invention prevents the recurrence of a duplicate system outage on a computer network system. In an exemplary embodiment, the duplicate outage prevention tool may be implemented via a computer network system such as that depicted in FIG. 1. System 100 of FIG. 1 represents a distributed computing environment including a server 102 coupled to three workstations 104A–C via a network bus 106. A data storage device 108 is in communication with server 102 via network bus 106 as well.

Server 102 may be an e-business enterprise server such as IBM's eServer zSeries 900(TM) that executes a multi-user, multitasking operating system such as IBM's z/OS(TM) as well as Linux(TM). This combination of hardware and software provides an open application platform for facilitating interoperability of software applications across diverse software platforms. Other suitable hardware and software may be utilized in lieu of the above in order to realize the advantages of the invention. It will be understood that the hardware and software described above are used for illustrative purposes only.

In general, operating system software manages the basic functions of any computer system and comprises various components for implementing these basic functions. Operating systems have been around for many years and their functional components are well known to those who are skilled in the art and will not be discussed in detail with the exception of those components directly related to the invention. The specific components related to the invention include an ABEND (Abnormal End) Processing section, a LOGON authorization section, and a Command processing section. These components have been modified via modules for implementing the invention as will be discussed further herein.

Server 102 may also execute applications software such as maintenance tools, security and cryptographic tools, virtual machine (VM) data processing applications as well as other business applications known in the art.

Network bus 106 may include a data transmission means such as a local area network (LAN), wide area network (WAN), or Internet network for allowing distant or remote communications and use. Network bus 106 may further include wireless communications capabilities as are known in the art.

Workstations 104A–C include computer processing terminals such as IBM's PowerPC(TM) or other general purpose computer devices as appropriate. A user at one of workstations 104A–C enters data, typically including user name and password to gain access to resources on network system 100. In the example shown, workstations 104A and 104B are utilized by individuals with general level access permissions for communicating with other system users, creating and editing documents, and other business related functions.

Further, a system support/operator at workstation 104C is a privileged user and may limit demand on the system resources with additional authority than normal users in that he can access resources such as files which are owned by another user. He can add users to the system, delete users from the system, and change the access rights of any other user. He can also terminate "processes" (running programs) owned by any user, by using a simple operating system software-provided command, whereas normal users can only terminate their own processes. For purposes of illustration "connection over a network" will be taken to encompass both local and remote connections.

Data storage device 108 stores applications and information utilized by network system 100. Data storage device 108 executes database management system software such as IBM's DB/2(TM). Data storage device 108 also includes a persistent storage area 110 (e.g., a portion of nonvolatile or read-only memory (ROM)) for storing static information and instructions for server 102. Data storage device 108 may also include random access memory (RAM) to store dynamic information for server 102. Alternative configurations include any medium for storage of computer readable information such as read-only memory (ROM), a hard disk drive with removable media (e.g., a floppy magnetic disk or an optical disk), or a tape drive with removable media (magnetic tape), synchronous DRAM or a flash memory. A combination of these, or other devices that support reading or writing computer readable media, could be used.

User ID files 112 are stored in persistent storage area 110. User ID files comprise user accounts that are created when adding a new user to the operating system. User ID files 112 define these user accounts and their characteristics. An entry in the file enables the user to be granted access to the system following authentication by means of a password. User ID files generally contain one record for each user. Each record further includes a field for a unique user identifier which the user supplies at logon to identify himself to the system. A second field may be used for user authentication at logon which may contain an encrypted password for the user or a pointer to the encrypted password. Another field may contain a user number which may distinguish a normal user from a system support or privileged user account. Other fields could identify a group to which the individual belongs, home directory field, and initial program or 'shell' which runs when the user logs on.

Offending user ID field 114 stores the user account information for the offending user system for use in preventing re-access into the system. This field will be discussed further herein.

Exemption list 116 stores user account information for system users who must not be denied re-access into the system, without regard to whether or not the particular user(s) caused the outage.

Modifying modules 118 contain the specific instructions for implementing the multiple outage prevention tool as will be described further herein.

It will be clear to one skilled in the art that the invention can operate upon a wide range of programmable computer systems and is not limited to the devices of network system 100 described above.

Figure 2:
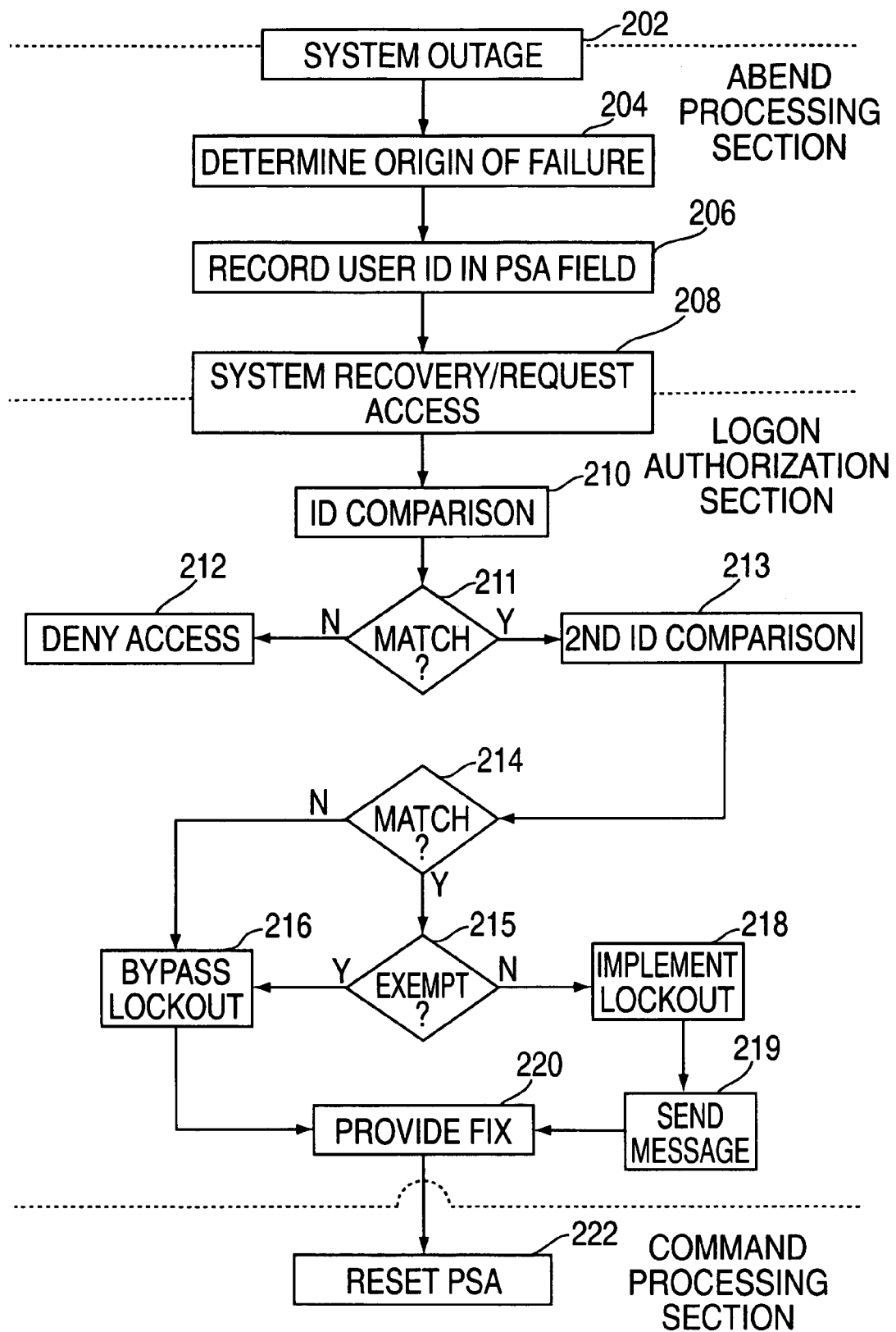
FIG. 2 is a flowchart describing the process of preventing the recurrence of a system outage subsequent to recovery of the system in a first embodiment.

FIG. 2 describes the process by which an operating system executing on server 102 prevents the recurrence of a duplicate system outage in a first embodiment of the invention. A system user running one or more applications on a workstation such as one of workstations 104A–C experiences an outage at step 202. The ABEND Processing section of the operating system determines the user ID of the offending workstation at step 204. Modification of the Abending Processing section comprises an instruction that saves the running UserID from the ABENDING processor/workstation in persistent storage area 110. This is accomplished by the creation of a new field 114 which is added to persistent work area 110 to reflect an offending user ID. The offending user ID is recorded at step 206.

Upon recovery of the system, the offending user attempts to gain access at step 208. The LOGON authorization section of the operating system includes a modifying module with instructions that allows for comparisons to be made of the user IDs shown to have requested re-entry against user ID files 112 stored in persistent work area 110. These comparisons are used to determine if a user is authorized to access the system. As indicated above, user IDs are stored in user account records provided in user files 112. The operating system compares user IDs at step 210. If no match is found at step 211, then access to the system is denied at step 212. If a match is found at step 211, the operating system then checks the offending user ID field and compares it to the requesting user ID information at step 213. If no match is found at step 214, the user is determined not to be the offending user responsible for the outage. As such, the lockout is bypassed for this user at step 216 in order to allow him/her re-access to the system.

On the other hand, if a match is found at step 214, this indicates that the user requesting access is, in fact, responsible for the outage occurrence. The operating system checks to see if the offending user ID is listed in the exemption list file 116 at step 215. Exemption list file 116 stores the user IDs of any individuals who must not be denied access. For example, a system administrator, RACF, TCP/IP, etc. may be exempted from any lockout procedure. If the individual user ID is found in exemption list 116 at step 215, the operating system bypasses the lockout procedure at step 216 and grants the user access to the system. If the user ID is not found in exemption list 116 at step 215, the operating system implements a lock out procedure, denying access to the offending user ID at step 218. The operating system then sends a message to the user informing him/her of the lock out activity at step 219. The message may include instructions for the user to contact a system administrator for assistance. Instructions provided in modifying modules 118 may include the following commands.

Compare UserID attempting access to offending UserID in Persistent storage area
   If they match AND LOCKOUT is On and not in an exemption list then fail access authority and display error/information message else grant access.

At step 220 a fix is provided that resolves the problem which caused the outage. The system support person resets the persistent storage area effectively eliminating the offending user ID information at step 222. This may be accomplished by using a privileged command. Instructions provided in modifying modules 118 may include the following commands.

Figure 3:
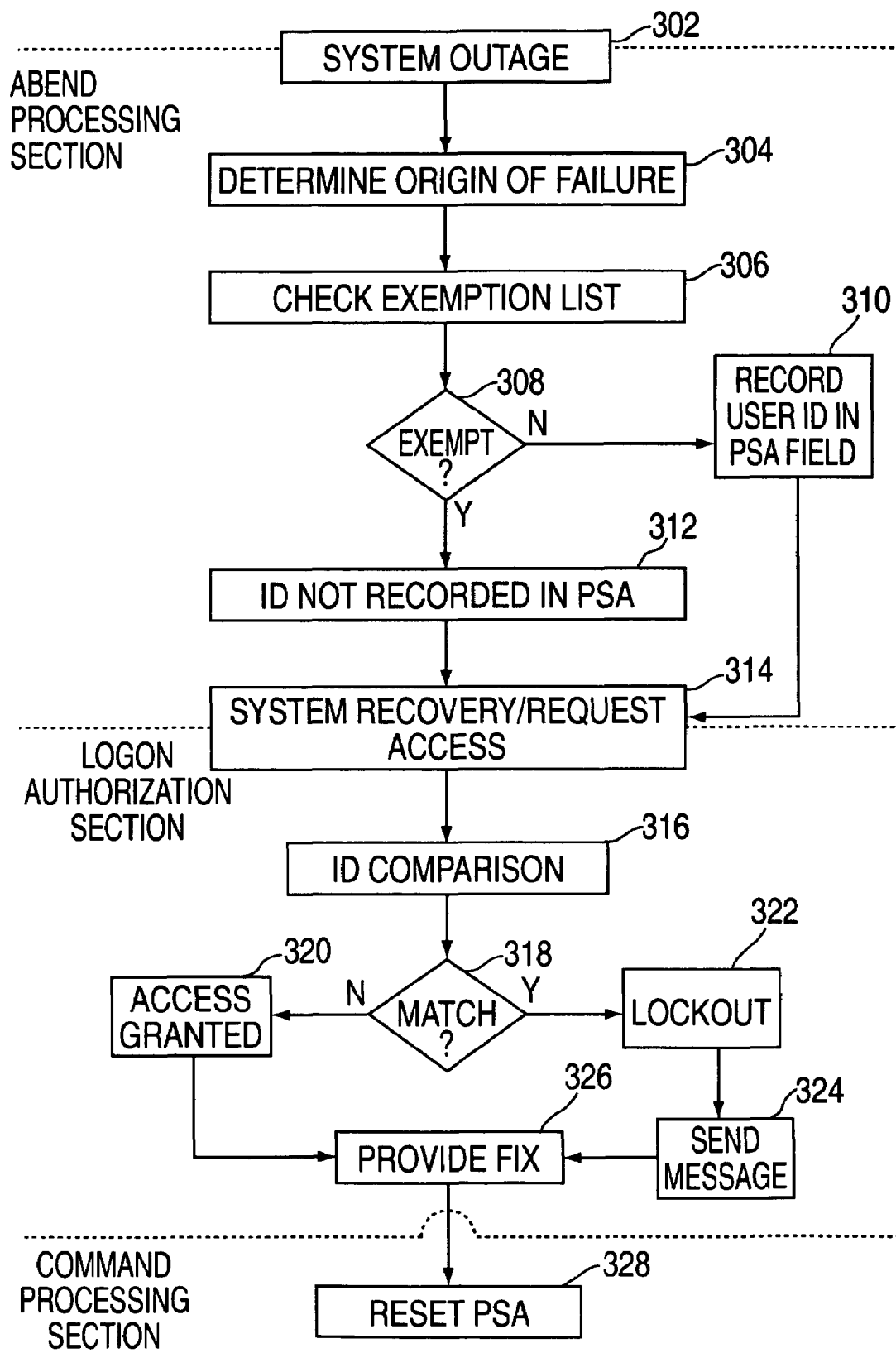
FIG. 3 is a flowchart describing the process of preventing the recurrence of a system outage subsequent to recovery of the system in an alternative embodiment.

If LOCKOUT specified then
   If On specified set lockout flag
   elseif
      Off specified reset lockout flag
   elseif
      Reset specified clear persistent storage area
   else invalid option FIG. 3 describes the process by which an operating system executing on server 102 prevents the recurrence of a duplicate system outage in an alternative embodiment of the invention. A system user running one or more applications on a workstation such as one of workstations 104A–C experiences an outage at step 302. The ABEND Processing section of the operating system determines the user ID of the offending workstation at step 304. Upon verification of the existence of the user ID in the user ID file 112, the operating system checks an exemption list 116 for determining whether a requesting user ID is exempt from a lockout at step 306. If the user is exempt (step 308), the user ID is not recorded in the persistent storage area 110 at step 312. If the user is not on the exemption list (step 308), the user ID is recorded in persistent storage area 110 at step 310. In either event, upon system recovery, a user requests access to the system at step 314. The LOGON authorization section of the operating system performs a comparison of the requesting user IDs to the offending user ID field 114 at step 316. If a match is found (step 318), the user is locked out of the system at step 322 and a message is sent to the user at step 324. If a match is not found, the user is granted access at step 320. In either case, once the system is fixed (step 326), the persistent storage area 110 is reset at step 328.

The invention allows the operating system to dynamically record the offending user ID in a persistent storage area for use in locking out that user before he/she attempts to regain access and repeat the activity that caused the original outage before system support personnel can take action.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those who are skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling with the scope of the appended claims.

The invention claimed is:

1. A network system for preventing recurrence of a duplicate system outage, comprising:
   a server coupled to a network bus;
   an operating system executing on said server; said operating system including components comprising:
      an ABEND processing section;
      a logon authorization section; and
      a command processing section;
   a data storage device operably connected to said server;
   a persistent storage area included in said data storage device, said persistent storage area including:
      user ID files including user account records associated with users of said network system, said user account records storing user IDs;
      an exemption list;
      an offending user ID field; and
      modifying modules associated with said operating system; and
   at least one workstation operably coupled to said network bus;
wherein upon an outage occurrence, said modifying modules cause said operating system to determine a user ID responsible for said outage occurrence, selectively lock out a workstation associated with said user ID, and upon system resolution, reinstate access to said user ID.

2. The system of claim 1, wherein said user account records include fields, comprising:
   a user ID field;
   authentication field; and
   privilege data field.

3. The system of claim 1, wherein said exemption list includes user IDs of network system users exempt from being locked out of said network system.

4. The system of claim 1, wherein said offending user ID field stores said user ID responsible for causing said outage occurrence.

5. The system of claim 1, wherein said modifying modules include an instruction for recording said user ID responsible for causing said outage occurrence in said offending user ID field, said instruction supplementing instructions provided in said ABEND processing section of said operating system.

6. The system of claim 1, wherein said modifying modules include an instruction for comparing a user ID requesting re-entry to said network system with a user ID stored in said offending user ID field.

7. A method for preventing recurrence of a system outage in a computer network environment, comprising:
   determining a user ID of a workstation responsible for causing an outage occurrence;
   recording said user ID in an offending user ID field located in a persistent storage area in memory;
   upon recovery of said system, receiving a request to regain access by a user at a workstation;
   comparing a user ID of said user with user IDs stored in a user ID file; and
   based upon results of said comparing:
      if no match is found, denying said user access to said system;
      if a match is found, performing a second comparison between said user ID of said user and said user ID in said offending user ID field; and
      based upon results of said second comparison:
         if no match is found, permitting said user access to said system;
         if a match is found, performing a third comparison between said user ID of said user and an exemption list, said exemption list including at least one user ID of a user exempt from being denied access to said system; and
         based upon results of said third comparison:
            if a match is found, permitting said user access to said system; and
            if no match is found, transmitting a message to said user and denying access to said system.

8. The method of claim 7, further comprising:
   providing a fix to said system; and
      resetting said offending user ID field to permit future access to said user ID responsible for causing said outage occurrence.

9. The method of claim 7, wherein said determining a user ID of a workstation responsible for causing an outage occurrence and said recording said user ID in an offending user ID field is accomplished by a modifying module associated with an operating system executing on said system.

10. A storage medium encoded with machine-readable computer program code for preventing recurrence of a system outage in a computer network, the storage medium including instructions for causing the computer network to implement a method comprising:
   determining a user ID of a workstation responsible for causing an outage occurrence;
   recording said user ID in an offending user ID field located in a persistent storage area in memory;
   upon recovery of said system, receiving a request to regain access by a user at a workstation;
   comparing a user ID of said user with user IDs stored in a user ID file; and
   based upon results of said comparing:
      if no match is found, denying said user access to said system;
      if a match is found, performing a second comparison between said user ID of said user and said user ID in said offending user ID field; and
      based upon results of said second comparison:
         if no match is found, permitting said user access to said system;
         if a match is found, performing a third comparison between said user ID of said user and an exemption list, said exemption list including at least one user ID of a user exempt from being denied access to said system; and
         based upon results of said third comparison:
            if a match is found, permitting said user access to said system; and
            if no match is found, transmitting a message to said user and denying access to said system.

11. The storage medium of claim 10, further comprising instruction for causing said network system to implement:
   providing a fix to said system; and
   resetting said offending user ID field to permit future access to said user ID responsible for causing said outage occurrence.

12. The storage medium of claim 10, wherein said determining a user ID of a workstation responsible for causing an outage occurrence and said recording said user ID in an offending user ID field is accomplished by a modifying module associated with an operating system executing on said system.

* * * * *